(12) United States Patent
Chaen et al.

(10) Patent No.: US 12,381,289 B2
(45) Date of Patent: Aug. 5, 2025

(54) BUS BAR

(71) Applicant: Yazaki Corporation, Tokyo (JP)

(72) Inventors: Takahiro Chaen, Shizuoka (JP);
Yasuhiro Yamaguchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 531 days.

(21) Appl. No.: 17/882,117

(22) Filed: Aug. 5, 2022

(65) Prior Publication Data

US 2023/0041029 A1   Feb. 9, 2023

(30) Foreign Application Priority Data

Aug. 6, 2021   (JP) ................. 2021-129505

(51) Int. Cl.
*H01M 50/516*   (2021.01)
*H01M 50/505*   (2021.01)
*H01M 50/521*   (2021.01)

(52) U.S. Cl.
CPC ....... *H01M 50/516* (2021.01); *H01M 50/505* (2021.01); *H01M 50/521* (2021.01)

(58) Field of Classification Search
CPC ............. H01M 50/502; H01M 50/505; H01M 50/516; H01M 50/521; Y02E 60/10
See application file for complete search history.

(56) References Cited

FOREIGN PATENT DOCUMENTS

| | | | |
|---|---|---|---|
| JP | 2001-286028 A | 10/2001 |
| JP | 2004-350391 A | 12/2004 |
| JP | 2017-123318 A | 7/2017 |
| JP | 2019-008877 A | 1/2019 |

*Primary Examiner* — Victoria H Lynch
(74) *Attorney, Agent, or Firm* — Sughrue Mion, PLLC

(57) ABSTRACT

A bus bar includes a wiring pathway made from a conductive material and having bent portions bending at at least two sites of the wiring pathway. The wiring pathway includes members consecutively arranged to form a plate shape. At least two of the members have different characteristics. The members adjacent to each other are connected to each other by laser joining.

11 Claims, 5 Drawing Sheets

BUS BAR

CROSS REFERENCE TO RELATED APPLICATION

The present application is based on, and claims priority from the prior Japanese Patent Application No. 2021-129505, filed on Aug. 6, 2021, the entire contents of which are incorporated herein by reference.

TECHNICAL FIELD

The disclosure relates to a bus bar.

BACKGROUND

JP 2001-286028 A proposes a bus bar including a wiring pathway formed of a member which is made from a conductive material and has bent portions bending at two sites at least. The wiring pathway is formed of a single plate shaped member.

The single plate shaped member is formed in a shape along the wiring pathway by performing press working on a single flat plate shaped base material. Alternatively, the single plate shaped member is formed in a shape along the wiring pathway by performing a forming process on a single linear base material.

SUMMARY

Formation of the member along the wiring pathway by press working causes the dies therefor to be complicated and requires a lot of manufacturing processes, thereby increasing the cost. Formation of the member along the wiring pathway by a forming process causes the member to crack when the bending radius of the bent portion is small, for example, and therefore it is sometimes not possible to satisfy the manufacturing requirements.

The disclosure is directed to a bus bar capable of easily corresponding with wiring pathways having various shapes.

A bus bar in accordance with some embodiments includes a wiring pathway made from a conductive material and having bent portions bending at at least two sites of the wiring pathway. The wiring pathway includes members consecutively arranged to form a plate shape. At least two of the members have different characteristics. The members adjacent to each other are connected to each other by laser joining.

According to the aforementioned configuration, it is possible to provide a bus bar capable of easily corresponding with wiring pathways having various shapes.

DETAILED DESCRIPTION

Figure 1:
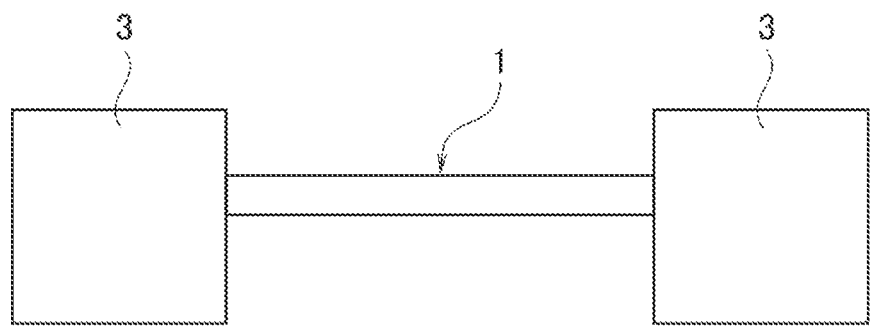
FIG. 1 is a block diagram of a bus bar according to an embodiment applied between different battery stacks.

Various embodiments will be described hereinafter with reference to the accompanying drawings.

A detailed description will be hereinbelow provided for a bus bar 1 according to an embodiment by referring to the drawings. It should be noted that the proportions of the dimensions of the drawings are exaggerated for illustration purposes and therefore the proportions may be different from actual ones.

Figure 2:
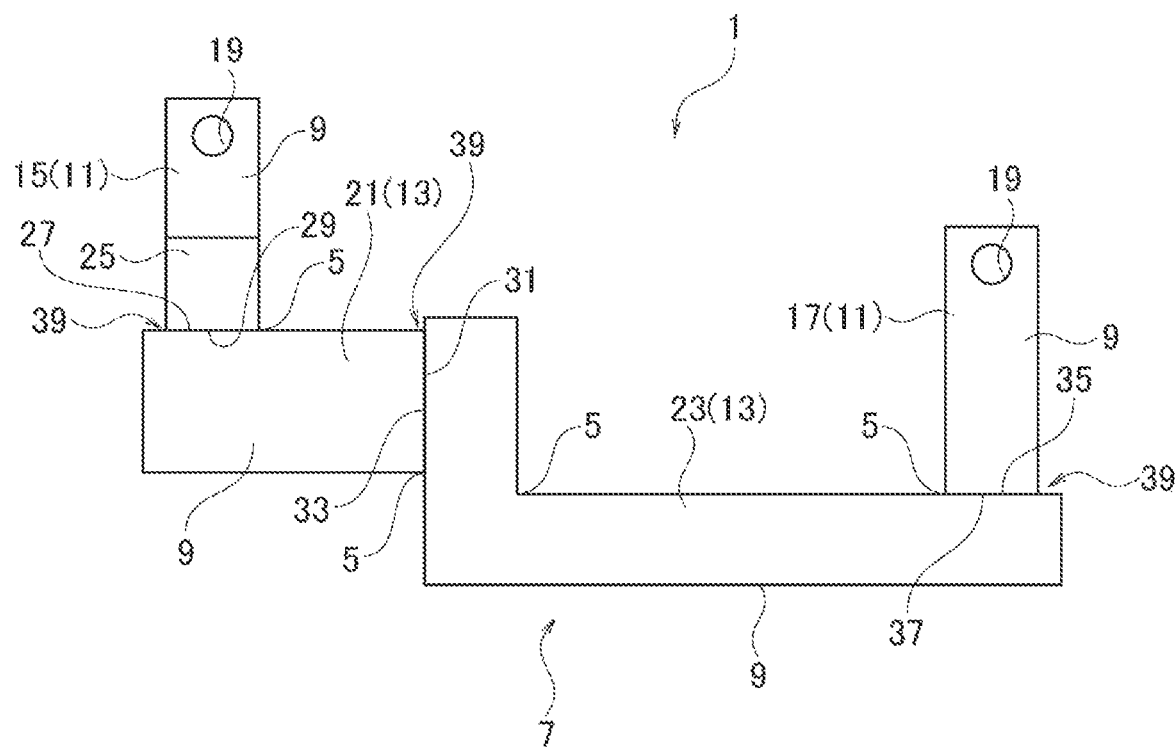
FIG. 2 is a plan view of an example of the bus bar according to the embodiment.

As illustrated in FIGS. 1 and 2, the bus bar 1 according to the embodiment is made from a conductive material and electrically connects between different battery stacks 3 mounted on a vehicle, for example. The bus bar 1 includes a wiring pathway 7 having bent portions 5 bending at at least two sites of the wiring pathway 7 to avoid interference with non-illustrated peripheral members arranged between the battery stacks 3. The wiring pathway 7 includes plate shaped members 9 consecutively arranged.

At least two members 9 of the members 9 have different characteristics. The characteristics include a material, thermal refining, a plate thickness, a plate width, a surface treatment and/or the like. For example, when the members 9 have different materials as the characteristics, the members 9 have different inherent natures such as weight and hardness. The members 9 include at least one connection member 11 and a conductive member 13 which have different characteristics.

The connection members 11 include a first connection member 15 and a second connection member 17 arranged at both ends of the wiring pathway 7. Connection portions 19 electrically connected to the battery stacks 3 are provided in the first connection member 15 and the second connection member 17, respectively. The connection portions 19 are fastening portions to which non-illustrated fastening members such as bolts are fastened, for example.

The first connection member 15 is made from copper which has excellent electrical connection to the battery stack 3 and is suitable for fastening of the fastening members, for example. The first connection member 15 may be made from copper alloy composed mainly of copper. The second connection member 17 is made from 6000 series aluminum alloy composed mainly of aluminum which has excellent electrical connection to the battery stack 3 and is suitable for fastening of the fastening members, for example. The materials for the connection members 11 may be any materials as long as it has excellent conductivity and excellent stiffness, and the first connection member 15 and the second connection member 17 may be made from the same material. For example, the first connection member 15 may be made from aluminum alloy. The second connection member 17 may be made from copper or copper alloy.

The first connection member 15 and the second connection member 17 are respectively formed in a quadrangular plate shape by press working or a forming process. The first connection member 15 and the second connection member 17 are readily processable due to their simple quadrangular shape, thereby reducing the manufacturing cost. In the embodiment, the first connection member 15 and the second connection member 17 have the same plate thickness and the same plate width, but have different plate lengths. In a case where the first connection member 15 and the second connection member 17 are made from the same material and have the same plate thickness, the same plate width, and the same plate length, the first connection member 15 and the second connection member 17 can be formed by the same processing method, thereby reducing the manufacturing cost even more. The conductive member 13 is arranged between the first connection member 15 and the second connection member 17.

The conductive member 13 includes a first conductive member 21 and a second conductive member 23 arranged between the first connection member 15 and the second connection member 17 in the wiring pathway 7. The first conductive member 21 and the second conductive member 23 are made from 1000 series aluminum alloy composed mainly of aluminum which is softer than and superior in formability to the connection members 11, for example. The material for the conductive member 13 may be any materials as long as it has excellent conductivity and excellent formability, and the first conductive member 21 and the second conductive member 23 may be made from different materials.

The first conductive member 21 and the second conductive member 23 are formed in shapes corresponding with the wiring pathway 7 by press working or a forming process. The first conductive member 21 is formed in a quadrangular plate shape. The first conductive member 21 is made from a material softer than the material of the respective connection members 11 and has a plate thickness less than the plate thickness of the respective connection members 11. Thus, the first conductive member 21 is superior in formability to the connection members 11 and is readily processable, thereby reducing the manufacturing cost. The first conductive member 21 has a plate width larger than the plate width of the respective connection members 11. Thus, the first conductive member 21 has a surface area larger than the surface area of the respective connection members 11, allowing the first conductive member 21 to have higher heat dissipation than the respective connection members 11.

The second conductive member 23 is formed in a plate shape to have a single bent portion 5. The second conductive member 23 is made from a material softer than the material of the respective connection members 11 and has the plate thickness less than the plate thickness of the respective connection members 11. Thus, the second conductive member 21 is superior in formability to the connection members 11 and processing for forming the bent portion 5 can be easily carried on, thereby reducing the manufacturing cost. Although the second conductive member 23 has the same plate thickness as the first conductive member 21 in the embodiment, the second conductive member 23 may have a plate thickness larger than the plate thickness of the first conductive member 21 as long as the second conductive member 23 has a plate thickness less than the plate thickness of the respective connection members 11. Although the second conductive member 23 has the same plate width as the connection members 11 in the embodiment, the second conductive member 23 may have a plate width larger than the plate width of the respective connection members 11 to improve heat dissipation.

The members 9 including the connection member 11 and the conductive member 13 described above are arranged along the wiring pathway 7 and the portions in contact with each other are connected to each other by laser joining. The first connection member 15 and the first conductive member 21 are made from different metals (copper and aluminum, for example). Thus, a direct connection of the first connection member 15 and the first conductive member 21 generates an intermetallic compound, causing the joint strength to decrease. Accordingly, the first connection member 15 and the first conductive member 21 are connected to each other via a clad member 25. In a case where the second connection member 17 is made from copper or copper alloy (a material different from the second conductive member 23) as with the first connection member 15, the second connection member 17 and the second conductive member 23 may be connected to each other via a clad member 25.

The clad member 25 is made from a conductive material including the same types of metal as the first connection member 15 and the first conductive member 21 (copper and aluminum, for example). For example, the clad member 25 is formed by exploding copper and aluminum or by rolling copper and aluminum. The clad member 25 is arranged between the first connection member 15 and the first conductive member 21 and connected to the first connection member 15 and the first conductive member 21 by laser joining. This interposition of the clad member 25 prevents generation of an intermetallic compound between the first connection member 15 and the first conductive member 21, allowing the joint strength to be retained.

An example of the connection of the members 9 in the bus bar 1 is described below. First, the clad member 25 is arranged to be in contact with one end surface of the first connection member 15 in the length direction of the first connection member 15, and the portions in contact with each other are connected to each other by laser joining. Next, a connection surface 29 which is an end surface of the clad member 25 is arranged to be in contact with a connection surface 27 which is one end surface of the first conductive member 21 in the width direction of the first conductive member 21, and the portions at which the connection surfaces 27, 29 are located are connected to each other by laser joining. The connection of the first connection member 15 (the clad member 25) and the first conductive member 21 forms a bent portion 5 in the wiring pathway 7.

Next, a connection surface 33 which is one end surface of the second conductive member 23 in the width direction of the second conductive member 23 is arranged to be in contact with a connection surface 31 which is one end surface of the first conductive member 21 in the length direction of the first conductive member 21, and the portions at which the connection surfaces 31, 33 are located are connected to each other by laser joining. The connection of the first conductive member 21 and the second conductive member 23 forms a bent portion 5 in the wiring pathway 7. Noted that the second conductive member 23 is also formed with a bent portion 5 in the wiring pathway 7. Then, a connection surface 37 which is one end surface of the second connection member 17 in the length direction of the second connection member 17 is arranged to be in contact with a connection surface 35 which is one end surface of the second conductive member 23 in the width direction of the second conductive member 23, and the portions at which the connection surfaces 35, 37 are located are connected to each other by laser joining. The connection of the second conductive member 23 and the second connection member 17 forms a bent portion 5 in the wiring pathway 7.

In this way, the wiring pathway 7 having the bent portions 5 bending at at least two sites of the wiring pathway 7 can be formed by consecutively connecting the members 9 by laser joining. Thus, there is no need to form a single member in a shape along the wiring pathway 7 by press working or a forming process and it is possible to easily correspond with wiring pathways 7 having various shapes. Additionally, the connection of the members 9 having different characteristics allows arrangement of the optimum members at various locations in the wiring pathway 7.

Figure 3:
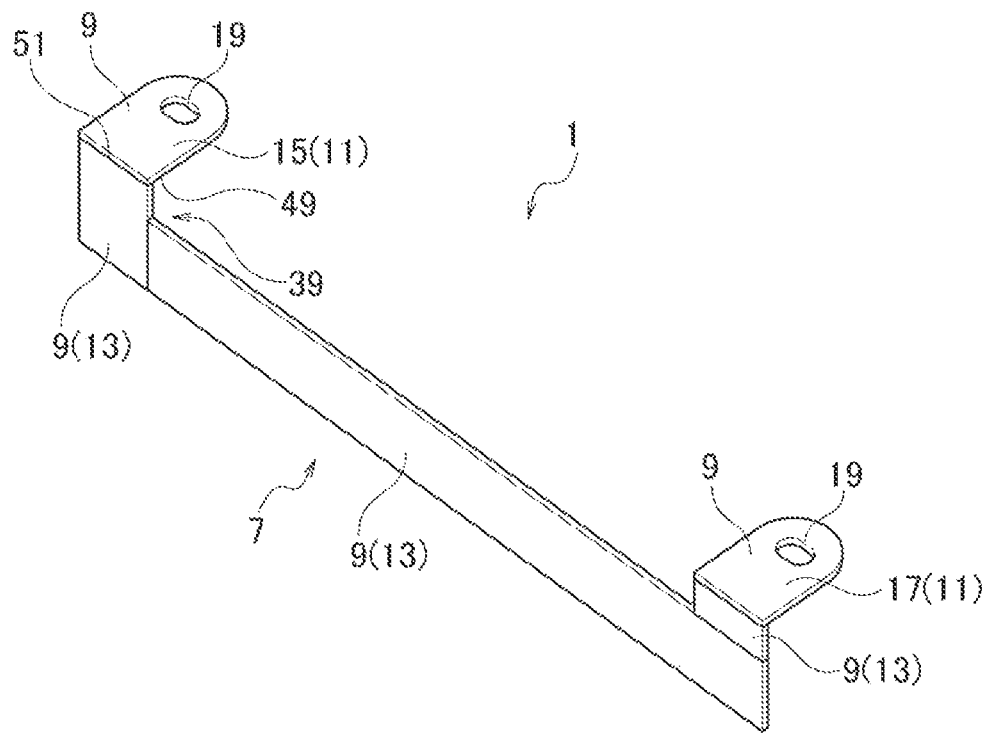
FIG. 3 is a perspective view of another example of the bus bar according to the embodiment.
Figure 4:
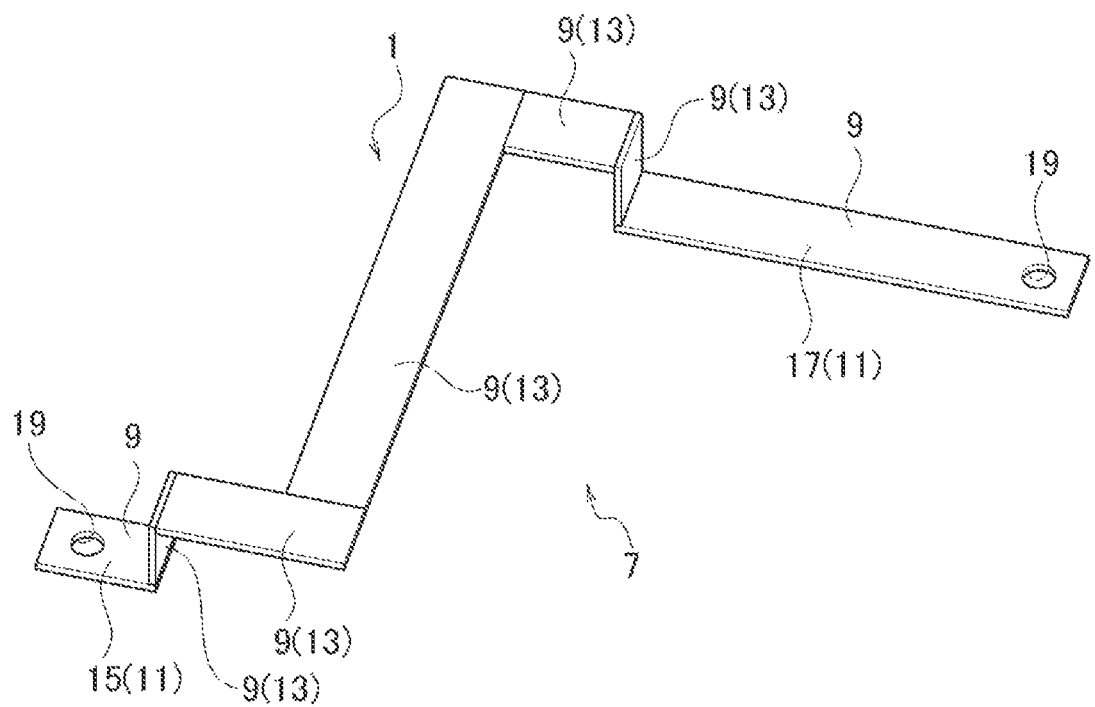
FIG. 4 is a perspective view of yet another example of the bus bar according to the embodiment.
Figure 5:
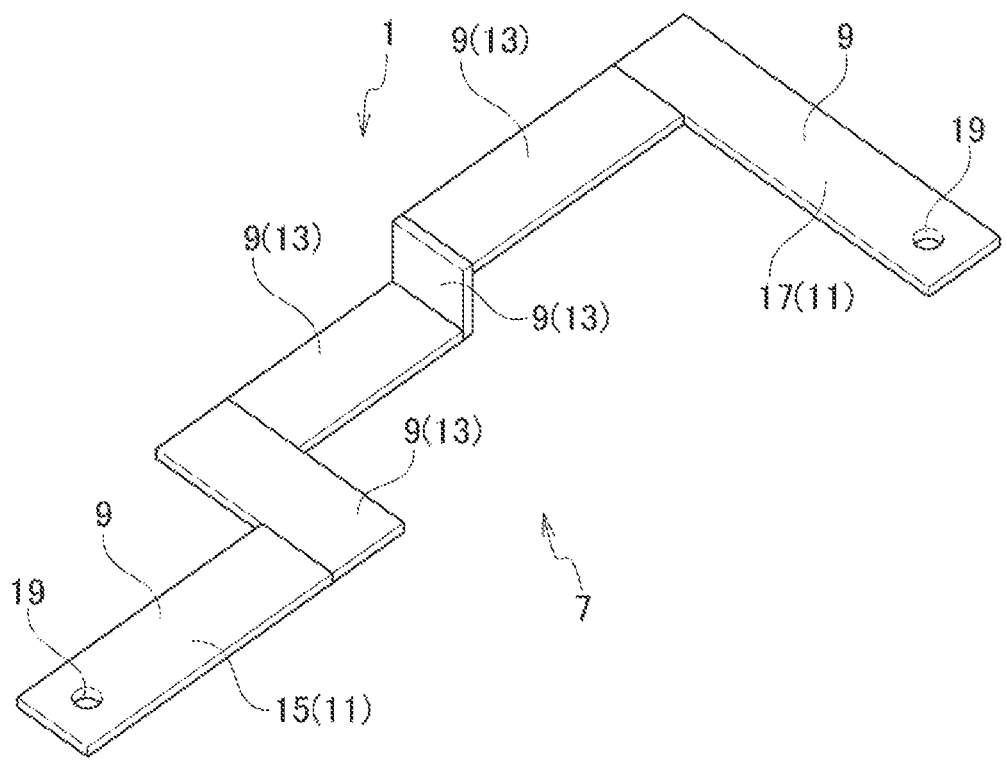
FIG. 5 is a perspective view of still yet another example of the bus bar according to the embodiment.

In the bus bar 1 described above, the members 9 are arranged in the same plane. However, the present invention is not limited to this. For example, as illustrated in FIGS. 3 to 5, the members 9 may be arranged three-dimensionally and consecutively connected to each other by laser joining in order to correspond with the three-dimensional wiring pathway 7. The bend angles at the bent portions 5 are not limited to 90 degrees. The bend angles at the bent portions 5 may be less than 90 degrees or more than 90 degrees in accordance with the bend shape of the wiring pathway 7.

In the first connection member 15 and the second connection member 17 which are arranged at both ends of the wiring pathway 7, the connection portions 19 need to be positioned to correspond to fixed points such as the different battery stacks 3. However, when a single member is processed to form the wiring pathway 7 so as to be along the wiring pathway 7, the positions of the connection portions 19 may be displaced due to manufacturing tolerances. For solving this problem, tolerance buffers 39 are provided in the connection portions of the members 9 in the embodiment.

In the tolerance buffer 39 at the connection portion of the first connection member 15 (the clad member 25 in the embodiment) and the first conductive member 21, the width of the connection surface 29 of the first connection member 15 and the width of the connection surface 27 of the first conductive member 21 are different from each other. The connection surface 29 of the first connection member 15 is the end surface facing the first conductive member 21 in the length direction of the first connection member 15, and includes the plate width of the first connection member 15. The connection surface 27 of the first conductive member 21 is the end surface facing the first connection member 15 in the width direction of the first conductive member 21, and includes the plate length of the first conductive member 21. In the tolerance buffer 39, even when a tolerance is generated in the width direction of the first connection member 15, the tolerance can be absorbed by moving the first conductive member 21 in the width direction of the first connection member 15 with respect to the connection surface 29 of the first connection member 15. The plate length of the first conductive member 21 is equal to or longer than a prescribed length corresponding to the wiring pathway 7. Thus, even if the first conductive member 21 is arranged to the right side in FIG. 2, for example, a lack of room for connection of the connection surface 27 of the first conductive member 21 to the connection surface 29 of the first connection member 15 is not caused, thereby enabling retention of the connection strength.

In the tolerance buffer 39 at the connection portion of the first conductive member 21 and the second conductive member 23, the width of the connection surface 31 of the first conductive member 21 and the width of the connection surface 33 of the second conductive member 23 are different from each other. The connection surface 31 of the first conductive member 21 is the end surface facing the second conductive member 23 in the length direction of the first conductive member 21, and includes the plate width of the first conductive member 21. The connection surface 33 of the second conductive member 23 is the end surface located from the first connection member 15 side to the bent portion 5 of the second conductive member 23 and facing the first conductive member 21 in the width direction of the second conductive member 23, and includes the length from the first connection member 15 side to the bent portion 5 of the second conductive member 23. In the tolerance buffer 39, even when a tolerance is generated in the width direction of the first conductive member 21, the tolerance can be absorbed by moving the first conductive member 21 in the width direction of the first conductive member 21 with respect to the connection surface 33 of the second conductive member 23. The length of the second conductive member 23 from the first connection member 15 side to the bent portion 5 of the second conductive member 23 is equal to or longer than a prescribed length corresponding to the wiring pathway 7. Thus, even if the first conductive member 21 is arranged to the upper side in FIG. 2, for example, a lack of room for connection of the connection surface 33 of the second conductive member 23 to the connection surface 31 of the first conductive member 21 is not caused, thereby enabling retention of the connection strength.

In the tolerance buffer 39 at the connection portion of the second conductive member 23 and the second connection member 17, the width of the connection surface 35 of the second conductive member 23 and the width of the connection surface 37 of the second connection member 17 are different from each other. The connection surface 35 of the second conductive member 23 is the end surface located from the bent portion 5 of the second conductive member 23 to the second connection member 17 side and facing the second connection member 17 in the width direction of the second conductive member 23, and includes the length from the bent portion 5 of the second conductive member 23 to the second connection member 17 side. The connection surface 37 of the second connection member 17 is the end surface facing the second conductive member 23 in the length direction of the second connection member 17, and includes the plate width of the second connection member 17. In the tolerance buffer 39, even when a tolerance is generated in the width direction of the second connection member 17, the tolerance can be absorbed by moving the second conductive member 23 in the width direction of the second connection member 17 with respect to the connection surface 37 of the second connection member 17. The length of the second conductive member 23 from the bent portion 5 of the second conductive member 23 to the second connection member 17 side is equal to or longer than a prescribed length corresponding to the wiring pathway 7. Thus, even if the second conductive member 23 is arranged to the left side in FIG. 2, for example, a lack of room for connection of the connection surface 35 of the second conductive member 23 to the connection surface 37 of the second connection member 17 is not caused, thereby enabling retention of the connection strength.

An example of the tolerance absorption in the tolerance buffer 39 described above is described below by referring to FIGS. 6 and 7. Noted that the clad member 25 and the second conductive member 23 are omitted in FIGS. 6 and 7, and the conductive member 13 includes the first conductive member 21 only. The tolerance buffer 39 between the first connection member 15 and the first conductive member 21 includes connection surfaces 41, 43. The tolerance buffer 39 between the first conductive member 21 and the second connection member 17 includes connection surfaces 45, 47. The planar direction of the tolerance buffer 39 including the connection surfaces 41, 43 and the planar direction of the tolerance buffer 39 including the connection surfaces 45, 47 intersect one another. Specifically, the planar direction of the tolerance buffer 39 including the connection surfaces 41, 43 and the planar direction of the tolerance buffer 39 including the connection surfaces 45, 47 are mutually perpendicular.

Figure 6:
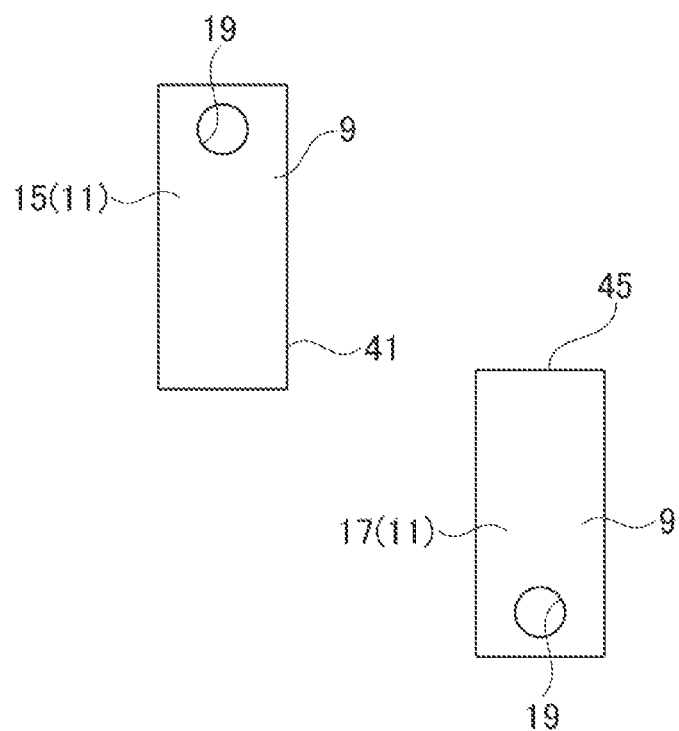
FIG. 6 is a plan view of arranged connection members of the bus bar according to the embodiment.
Figure 7:
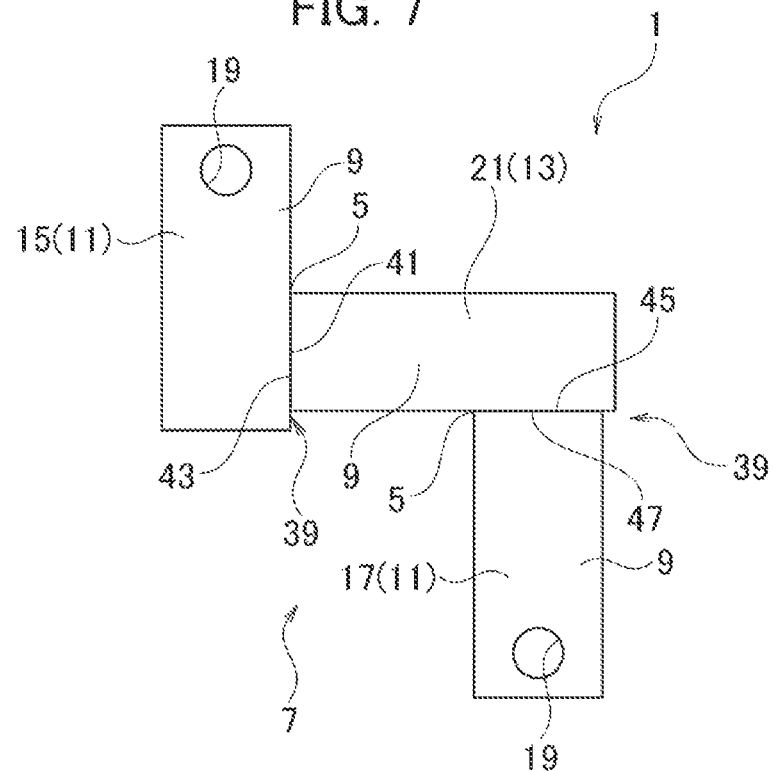
FIG. 7 is a plan view of the connection members illustrated in FIG. 6 and a conductive member which are connected to each other.

First, as illustrated in FIG. 6, the first connection member 15 and the second connection member 17 which are formed with the connection portions 19 are arranged such that the positions of the connection portions 19 are fixed at prescribed positions. Next, as illustrated in FIG. 7, the first conductive member 21 is arranged between the first connection member 15 and the second connection member 17 such that the connection surface 43 is in contact with the connection surface 41 of the first connection member 15 and the connection surface 47 is in contact with the connection surface 45 of the second connection member 17. When there is a tolerance in the length direction of the first connection member 15 and the second connection member 17, the tolerance can be absorbed by the tolerance buffer 39 between the connection surface 41 of the first connection member 15 and the connection surface 43 of the first conductive member 21. When there is a tolerance in the width direction of the first connection member 15 and the second connection member 17, the tolerance can be absorbed by the tolerance buffer 39 between the connection surface 47 of the first conductive member 21 and the connection surface 45 of the second connection member 17. Then, the connection surfaces 41, 43 are connected to each other by laser joining and the connection surfaces 45, 47 are connected to each other by laser joining.

In this way, provision of the tolerance buffers 39 in the bus bar 1 enables absorption of manufacturing tolerances in the wiring pathway 7. Thus, it is possible to correspond with wiring pathways 7 having various shapes without variation in the dimensional accuracy. Particularly, it is possible to retain the electrical connection reliability without displacement of the positions of the connection portions 19 of the connection members 11. Intersection of the planar direction of the tolerance buffer 39 including the connection surfaces 41, 43 and the planar direction of the tolerance buffer 39 including the connection surfaces 45, 47 enables absorption of tolerances in the two directions which intersect one another.

Absorption of tolerances by the tolerance buffers 39 is not limited to a case where the members 9 are arranged in the same plane, and can be also applied to a case such as the bus bar 1 illustrated in FIGS. 3 to 5 where the members 9 are arranged three-dimensionally. For example, in the bus bar 1 illustrated in FIG. 3, the tolerance buffer 39 can be applied to the connection surface 49 of the first connection member 15 and the connection surface 51 of the conductive member 13 at the connection portion of the first connection member 13 and the conductive member 13. The connection surface 49 of the first connection member 15 is the end surface facing the conductive member 13 in the plate thickness direction of the first connection member 15 (the lower surface in FIG. 3), and includes the plate length of the first connection member 15. The connection surface 51 of the conductive member 13 is the end surface facing the first connection member 15 in the length direction of the conductive member 13, and includes the plate thickness of the conductive member 13. In the tolerance buffer 39, even when a tolerance is generated in the length direction of the first connection member 15, the tolerance can be absorbed by moving the conductive member 13 in the length direction of the first connection member 15 with respect to the connection surface 49 of the first connection member 15. Noted that a tolerance in the width direction of the first connection member 15 can be absorbed by the tolerance buffer 39 including the connection surfaces 49, 51 in a case where the plate width of the conductive member 13 is larger than the plate width of the first connection member 15.

Since the bus bar 1 is a member which electrically connects between the battery stacks 3, it is preferable to perform plate processing as surface treatment in order to improve the electrical connection reliability between the bus bar 1 and the battery stacks 3. However, in a case where the bus bar 1 is formed of a single member, it is necessary to perform plate processing on the entirety of the bus bar 1, thereby increasing the used amount of a plating material and thus increasing the cost. Although plate processing may be performed in a state where the portion other than the connection portions 19 of the bus bar 1 is masked in order to decrease the used amount of a plating material, it is still necessary to perform masking work, thereby increasing the cost. Thus, only the connection members 11 are plated in the bus bar 1 according to the embodiment.

An example of the bus bar 1 on which plate processing described above is performed is described below by referring to FIGS. 8 and 9. Noted that the bus bar 1 includes the first connection member 15, the first conductive member 21, and the second connection member 17 in FIG. 8. The bus bar 1 includes the first connection member 15, the first conductive member 21, and the second conductive member 23 in FIG. 9. Also noted that the tolerance buffers 39 are omitted in FIGS. 8 and 9.

Figure 8:
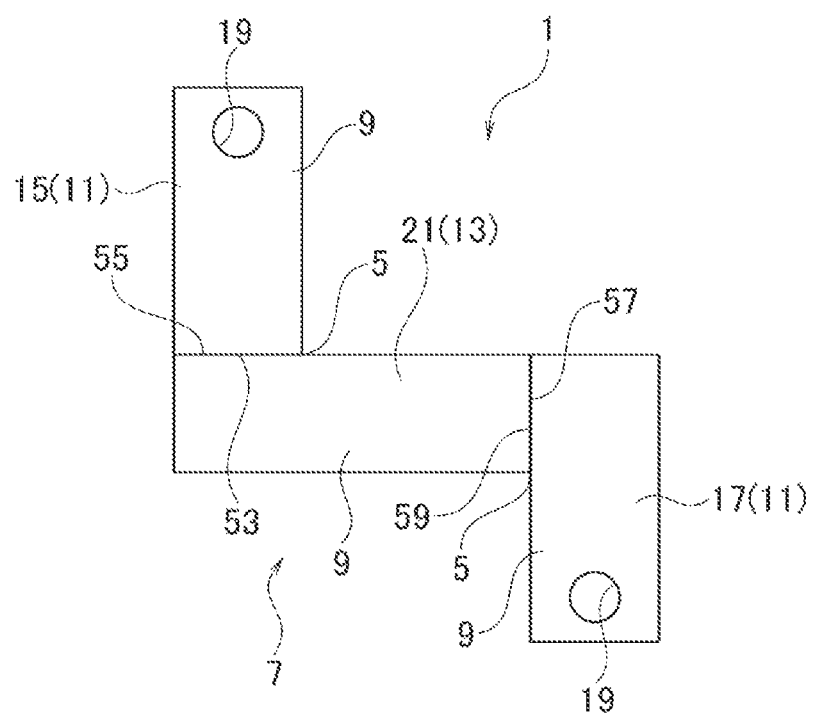
FIG. 8 is a plan view of still yet another example of the bus bar according to the embodiment.

As illustrated in FIG. 8, the bus bar 1 is formed by consecutively connecting the first connection member 15, the first conductive member 21, and the second connection member 17 by laser joining. The first connection member 15 and the first conductive member 21 are connected to each other by laser joining in a state where a connection surface 53 which is one end surface of the first connection member 15 in the length direction of the first connection member 15 and a connection surface 55 which is an end surface of the first conductive member 21 facing the first connection member 15 in the width direction of the first conductive member 21 are in contact with each other. The first conductive member 21 and the second connection member 17 are connected to each other by laser joining in a state where a connection surface 57 which is one end surface of the first conductive member 21 in the length direction of the first conductive member 21 and a connection surface 59 which is an end surface of the second connection member 17 facing the first conductive member 21 in the width direction of the second connection member 17 are in contact with each other.

In the bus bar 1 described above, plate processing as surface treatment is performed on the first connection member 15 and the second connection member 17 after the first connection member 15 and the second connection member 17 are formed by press working or a forming process, for example. In contrast, plate processing as surface treatment is not performed on the first conductive member 21 after the first conductive member 21 is formed by press working or a forming process, for example. Thus, in a state where the first connection member 15, the first conductive member 21, and the second connection member 17 are connected to each other, plate processing as surface treatment has been performed on only the first connection member 15 and the second connection member 17. Accordingly, it is possible to achieve a state where plate processing has been performed on the first connection member 15 and the second connection member 17 including the connection portions 19 without requiring masking work, thereby decreasing the cost of the bus bar 1. Additionally, it is possible to decrease the used amount of a plating material and thus decrease the cost.

Figure 9:
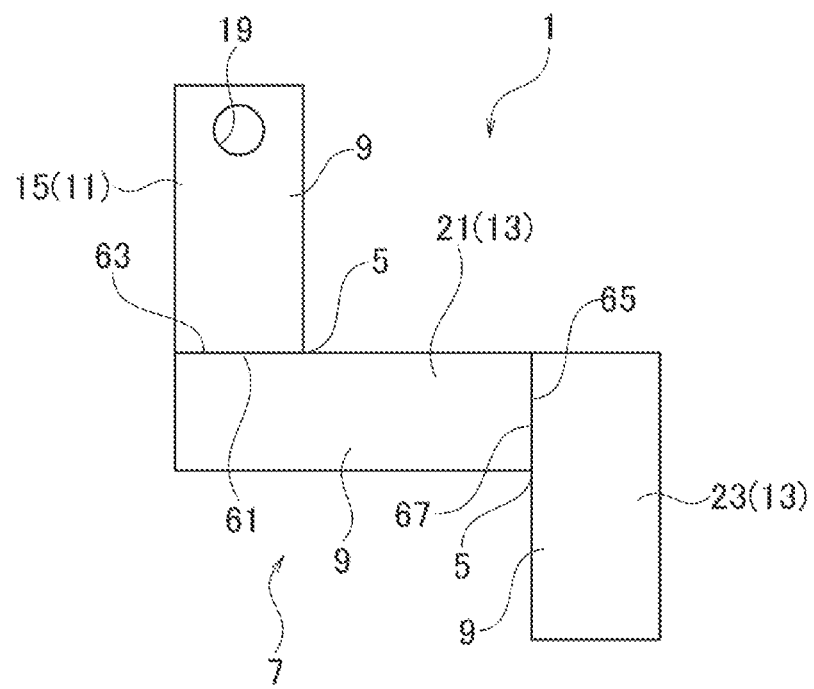
FIG. 9 is a plan view of still yet another example of the bus bar according to the embodiment.

As illustrated in FIG. 9, the bus bar 1 is formed by consecutively connecting the first connection member 15, the first conductive member 21, and the second conductive member 23 by laser joining. The first connection member 15 and the first conductive member 21 are connected to each other by laser joining in a state where a connection surface 61 which is one end surface of the first connection member 15 in the length direction of the first connection member 15 and a connection surface 63 which is an end surface of the first conductive member 21 facing the first connection member 15 in the width direction of the first conductive member 21 are in contact with each other. The first conductive member 21 and the second conductive member 23 are connected to each other by laser joining in a state where a connection surface 65 which is one end surface of the first conductive member 21 in the length direction of the first conductive member 21 and a connection surface 67 which is an end surface of the second conductive member 23 facing the first conductive member 21 in the width direction of the second conductive member 23 are in contact with each other.

In the bus bar 1 described above, plate processing as surface treatment is performed on the first connection member 15 after the first connection member is formed by press working or a forming process, for example. In contrast, plate processing as surface treatment is not performed on the first conductive member 21 and the second conductive member 23 after the first conductive member 21 and the second conductive member 23 are formed by press working or a forming process, for example. Thus, in a state where the first connection member 15, the first conductive member 21, and the second conductive member 23 are connected to each other, plate processing as surface treatment has been performed on only the first connection member 15. Accordingly, it is possible to achieve a state where plate processing has been performed on the first connection member 15 including the connection portion 19 without requiring masking work, thereby decreasing the cost of the bus bar 1. Additionally, it is possible to decrease the used amount of a plating material and thus decrease the cost. Noted that the second connection member 17 on which plate processing as surface treatment has been performed may be connected to the second conductive member 23 by laser joining.

In this way, the electrical connection reliability between the connection member(s) 11 and the battery stack(s) 3 can be improved by performing plate processing as surface treatment on the connection member(s) 11. Performing plate processing as surface treatment on the connection member(s) 11 can be also applied to a case such as the bus bar 1 illustrated in FIGS. 3 to 5 where the members 9 are arranged three-dimensionally. When the connection member(s) 11 which has been plated and the conductive member(s) 13 which has not been plated are connected to each other in the three-dimensional bus bar 1, the connection surfaces arranged in the same plane may be brought into contact with each other and then connected to each other by laser joining.

Figure 10:
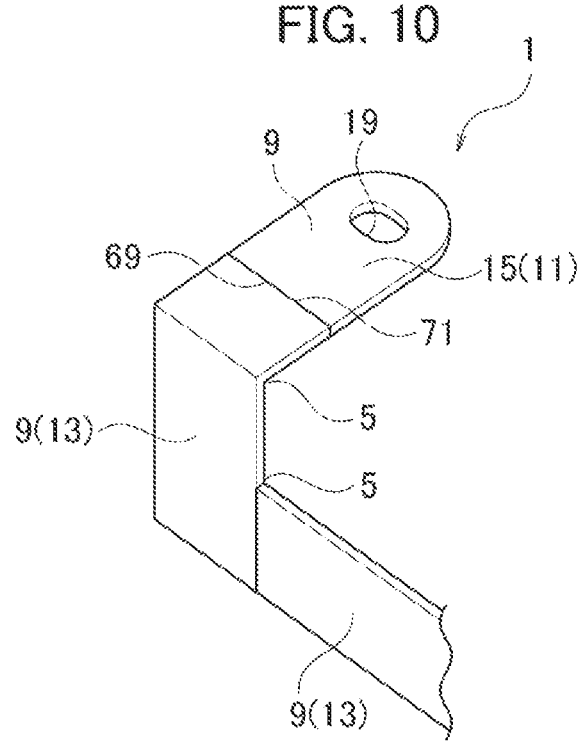
FIG. 10 is an enlarged perspective view of the main part of still yet another example of the bus bar according to the embodiment.

For example, in the bus bar 1 illustrated in FIG. 3, the conductive member 13 is bent at the connection portions between the first connection member 15 and the conductive member 13 such that a part of the conductive member 13 is located in the same plane as the first connection member 15 as illustrated in FIG. 10. Then, a connection surface 69 which is an end surface of the first connection member 15 and a connection surface 71 which is an end surface of the conductive member 13 located in the same plane are brought into contact with each other, and the portions at which the connection surfaces 69, 71 are in contact with each other are connected to each other by laser joining.

In the bus bar 1 illustrated in FIG. 3, when a connection surface 49 of the first connection member 15 and a connection surface 51 of the conductive member 13 are connected to each other, the position of the conductive member 13 is hard to see and the position for the laser irradiation is hard to identify if a laser is irradiated from the first connection member 15 side. When the connection surfaces 49, 51 are connected to each other as illustrated in FIG. 3, the welding quality may be degraded if a laser is irradiated from the first connection member 15 side since the conductive member 13 side is also melted by the welding. In contrast, when the connection surfaces 69, 71 located in the same plane are connected to each other as illustrated in FIG. 10, the connection portions are easy to see, improving workability. Additionally, since direct welding can be performed along the connection border of the connection surfaces 69, 71 without melting the opposite surface, the welding quality can be improved.

The bus bar 1 described above is made from a conductive material and includes the wiring pathway 7 having bent portions 5 bending at at least two sites of the wiring pathway 7. The wiring pathway 7 includes the plate shaped members 9 consecutively arranged. At least two members 9 of the members 9 have different characteristics. The members 9 adjacent to each other are connected to each other by laser joining.

Thus, there is no need to form a single member in a shape along the wiring pathway 7 by press working or a forming process and it is possible to easily correspond with wiring pathways 7 having various shapes. Additionally, the connection of the members 9 having different characteristics allows arrangement of the optimum members at various locations in the wiring pathway 7.

Thus, the bus bar 1 according to the embodiment can easily correspond with wiring pathways 7 having various shapes.

The members 9 include the connection members 11 arranged at both ends of the wiring pathway 7 and having the connection portions 19 for electrical input-output, and the conductive member 13 arranged between the connection members 11. The connection members 11 and the conductive member 13 have different characteristics. Thus, it is possible to improve the electrical connection reliability and easily correspond with wiring pathways 7 having various shapes by using members which have excellent electrical connection for the connection members 11 and using a member which has excellent formability for the conductive member 13.

The conductive member 13 has a plate thickness less than the plate thickness of the respective connection members 11 and has a plate width larger than the plate width of the respective connection members 11. Thus, the thin plate thickness of the conductive member 13 decreases the stiffness thereof, improving formability of the conductive member 13. The large plate width of the conductive member 13 increases the surface area thereof, improving heat dissipation of the conductive member 13.

The conductive member 13 is made from a material softer than the connection members 11. Thus, the conductive member 13 is readily processable, improving formability of the conductive member 13.

The conductive member 13 has a bent portion 5 at at least one site of the conductive member 13. Since the conductive member 13 is made from a material softer than the connection members 11, it is possible to easily provide a bent portion 5 in the conductive member 13.

The connection members 11 contain copper and the conductive member 13 contains aluminum. Thus, the connection members 11 can be members which have excellent electrical connection and the conductive member 13 can be a member which has excellent formability.

At least one connection member 11 and the conductive member 13 are connected to each other via the clad member 25 containing copper and aluminum. Thus, it is possible to prevent generation of an intermetallic compound due to different metals between the at least one connection member 11 and the conductive member 13, allowing the joint strength between the at least one connection member 11 and the conductive member 13 to be retained.

The wiring pathway 7 electrically connects between different battery stacks 3. Thus, it is possible to correspond with wiring pathways 7 having various shapes designed to be arranged between the battery stacks 3.

The bus bar 1 includes the members 9 which are made from a conductive material and consecutively arranged to form a plate shape defining the wiring pathway 7. The members 9 adjacent to each other are connected to each other by laser joining. The tolerance buffers 39 are provided between the members 9 adjacent to each other, and in each of the tolerance buffers 39 the connection surfaces of the members 9 adjacent to each other and to be connected to each other have different widths.

Thus, manufacturing tolerances generated when the wiring pathway 7 is formed with a single member can be absorbed by the tolerance buffers 39. Accordingly, it is possible to correspond with the designed wiring pathway 7 in the bus bar 1 described above with high accuracy.

The members 9 include at least three members 9. The tolerance buffers 39 are provided in at least two sites between the members 9 adjacent to each other and to be connected to each other. The planar directions of the connection surfaces of the members 9 adjacent to each other in the tolerance buffers 39 intersect one another. Thus, it is possible to absorb tolerances in the directions which intersect one another.

The planar directions of the connection surfaces in the tolerance buffers 39 are mutually perpendicular. Thus, it is possible to absorb tolerances in the directions which are mutually perpendicular.

The members 9 located at both ends of the wiring pathway 7 are the connection members 11 having the connection portions 19 for electrical input-output. Thus, absorption of tolerances by the tolerance buffers 39 enables retention of the electrical connection reliability without displacement of the positions of the connection portions 19.

The connection portions 19 are the fastening portions to which the fastening members are fastened. Thus, absorption of tolerances by the tolerance buffers 39 enables stable fastening of the fastening members and thus retention of the electrical connection reliability without displacement of the positions of the connection portions 19 which correspond to the fixed points.

The bus bar 1 includes the members 9 which are made from a conductive material and consecutively arranged to form a plate shape defining the wiring pathway 7. The members 9 adjacent to each other are connected to each other by laser joining. The members 9 include the connection members 11 located at both ends of the wiring pathway 7 and having the connection portions 19 for electrical input-output, and the conductive member 13 arranged between the connection members 11. In the members 9, only the connection members 11 are plated.

Thus, unlike a case where the wiring pathway 7 is formed of a single member, it is possible to achieve a state where plate processing has been performed on the connection members 11 including the connection portions 19 without requiring masking work, thereby decreasing the cost. Additionally, it is possible to decrease the used amount of a plating material and thus decrease the cost. Accordingly, it is possible to provide the bus bar 1, with which cost is reduced.

At least one connection member 11 and the conductive member 13 are connected to each other in a state where the connection surfaces 69, 71 located in the same plane are in contact with each other. Thus, the connection portions are easy to see, improving workability. Additionally, since direct welding can be performed along the connection border of the connection surfaces 69, 71, the welding quality can be improved.

The bus bar 1 includes the members 9 which are made from a conductive material and consecutively arranged to form a plate shape defining the wiring pathway 7. The members 9 adjacent to each other are connected to each other by laser joining. The members 9 include the connection member 11 located at one end of the wiring pathway 7 and having the connection portion 19 for electrical input-output, and the conductive member 13 connected to the connection member 11 in a state where the connection surface 71 of the conductive member 13 located in the same plane as the connection member 11 is in contact with the connection member 11. In the members 9, only the connection member 11 is plated.

Thus, unlike a case where the wiring pathway 7 is formed of a single member, it is possible to achieve a state where plate processing has been performed on the connection member 11 including the connection portion 19 without requiring masking work, thereby decreasing the cost. Additionally, it is possible to decrease the used amount of a plating material and thus decrease the cost. Since the connection member 11 and the conductive member 13 are connected to each other in a state where the connection surfaces 69, 71 located in the same plane are in contact with each other, the connection portions are easy to see, improving workability. Additionally, since direct welding can be performed along the connection border of the connection surfaces 69, 71, the welding quality can be improved. Accordingly, it is possible to provide the bus bar 1, with which cost is reduced.

The members 9 include the connection member 11 located at the other end of the wiring pathway 7 and having the connection portion 19 for electrical input-output. The connection member 11 is connected to the conductive member 13 in a state where the connection surface of the connection member 11 located in the same plane as the conductive member 13 is in contact with the connection member 13. In the members 9, only the connection members 11 are plated. Thus, it is possible to perform plate processing on only the connection members 11 arranged at both ends of the wiring pathway 7 and retain the electrical connection reliability at low cost.

The bus bar 1 according to the embodiment electrically connects the different battery stacks 3 to each other. However, the present invention is not limited to this. For example, the bus bar 1 may be arranged between any electric components, for example, between a power source and a device and between a device and a device.

The conductive member 13 in the embodiment has a single bent portion 5. However, the present invention is not limited to this. The conductive member 13 may have two or more bent portions 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A bus bar comprising:
a wiring pathway made from a conductive material and having bent portions bending at at least two sites of the wiring pathway,
wherein the wiring pathway comprises members consecutively arranged to form a plate shape, the members include:
connection members arranged at both ends of the wiring pathway and having connection portions for electrical input-output; and
a conductive member arranged between the connection members and connected to the connection members at opposite ends of the conductive member, and
wherein the connection members and the conductive member have different characteristics, and
wherein the wiring pathway includes a laser-fused joint between the consecutively arranged members.

2. The bus bar according to claim 1, wherein the conductive member has a plate thickness less than a plate thickness of the connection members and has a plate width larger than a plate width of the connection members.

3. The bus bar according to claim 1, wherein
the conductive member is made from a material softer than the connection members.

4. The bus bar according to claim 3, wherein the conductive member has the bent portion at at least one site of the conductive member.

5. The bus bar according to claim 1, wherein
the connection members contain copper, and
the conductive member contains aluminum.

6. The bus bar according to claim 5, wherein
the conductive member and at least one of the connection members are connected to each other via a clad member containing copper and aluminum.

7. The bus bar according to claim 1, wherein the wiring pathway electrically connects between different battery stacks.

8. The bus bar according to claim 1, wherein the characteristics include at least one of material, thermal refining, thickness, width, or surface treatment.

9. The bus bar according to claim 1, wherein the both ends of the wiring pathway are electrically connected between different battery stacks.

10. The bus bar according to claim 9, wherein the connection members include a first connection member and a second connection member arranged at the both ends of the wiring pathway, respectively, with the conductive member therebetween.

11. The bus bar according to claim 10, wherein the conductive member includes:
a first conductive member connected to the first connection member at a first end thereof; and
a second conductive member connected to the second connection member at a first end thereof,
wherein a second end of the first conductive member and a second end of the second conductive member, opposite to the first ends thereof, are connected to each other, and
wherein the connection between the second end of the first conductive member and the second end of the second conductive member forms one of the at least one two sites of the bent portions.

* * * * *